Aug. 4, 1925.
G. R. DERR
1,548,411
STEERING POST FOR AUTOMOBILES
Filed Oct. 27, 1924
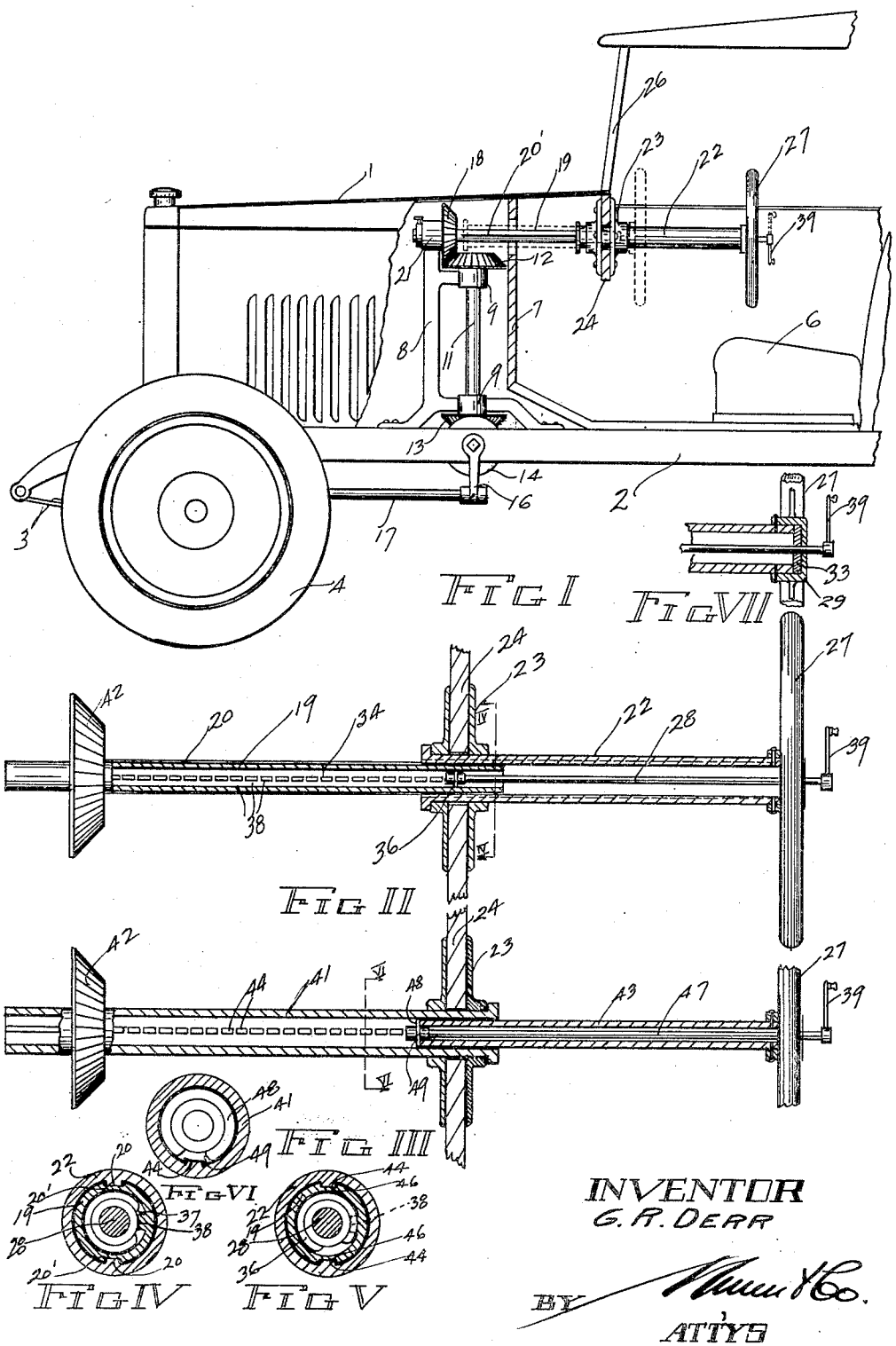

Patented Aug. 4, 1925.

1,548,411

UNITED STATES PATENT OFFICE.

GUY R. DERR, OF SANTA MARGARITA, CALIFORNIA.

STEERING POST FOR AUTOMOBILES.

Application filed October 27, 1924. Serial No. 746,225.

*To all whom it may concern:*

Be it known that I, GUY R. DERR, a citizen of the United States, and a resident of Santa Margarita, in the county of San Luis Obispo and State of California, have invented a new and useful Steering Post for Automobiles, of which the following is a specification.

The present invention relates to improvements in steering posts for automobiles, and its particular object is to provide a steering post that will be more convenient to handle than the steering post ordinarily used in the present motor vehicle. It is particularly proposed for this purpose to provide a steering post arranged horizontally with the steering wheel at the end thereof disposed in a vertical plane, and allowing the driver to manipulate the wheel while his elbows rest against his body, the vertical position of the wheel allowing the latter to be handled by merely pushing upward on one side and pulling straight downward on the other side. One of the advantages of this arrangement is that it allows the driver to hold his arms in the position which comes most natural to most people and a further advantage is that the steering wheel which usually, particularly in large cars, obstructs a portion of the field of vision can be disposed in such a manner as to be clearly below the latter field. It is further proposed to arrange the steering post in such a manner that it is extensible and allows the driver to push the steering wheel forward toward the dashboard of the motor vehicle when he wishes to leave the machine or to enter the same while, when seated, he may draw the wheel toward his seat into a position where it is most convenient to handle. Further objects and advantages of my device will appear as the specification proceeds.

The preferred form of my invention is illustrated in the accompanying drawing, in which Figure 1 shows an assembly arrangement of my steering mechanism arranged in a motor vehicle.

Figure 2 a longitudinal section through the steering post.

Figure 3 a longitudinal section through a steering post of a modified form.

Figure 4 a transverse section taken along line IV—IV of Figure 2.

Figure 5 a section taken along the same line with the locking element turned into locking position.

Figure 6 a transverse section taken along line VI—VI of Figure 3, and

Figure 7 a central section through the steering wheel.

While I have shown only the preferred form of the invention, it should be understood that various changes or modifications may be made within the scope of the claims hereto attached without departing from the spirit of the invention.

Of the automobile 1 only the front part is shown including a portion of the frame 2 resting on the springs 3 which latter are supported by wheels 4. A seat 6 is arranged a convenient distance behind the dashboard 7 and a suitable bracket 8 is supported on the frame in front of the latter board. The bracket 8 supports two vertically aligned bearings 9 in which is revolvably mounted a vertical shaft 11 terminating at the top in a bevel gear 12 and at the bottom in a bevel gear 13. The latter meshes with the bevel gear 14 mounted coaxially with the steering arm 16 which latter manipulates the tie bar 17 connected with the steering knuckle of the motor vehicle of conventional construction and, therefore, not shown in the drawing. The upper bevel gear 12 meshes with a bevel gear 18 on the shaft 19 supported in a bearing 21 forming part of the bracket 8 and in a sleeve 22 slidable in a bearing 23 associated with the board 24 suspended from the windshield 26.

The shaft 19 is disposed in a horizontal position and extends lengthwise of the body of the vehicle. The tube 22 which is slidable on the shaft 19 and is held against rotary motion by inner ribs 20 riding in registering grooves 20' of the shaft, has a steering wheel 27 secured to the rear end thereof and may be slid backward and forward on the shaft 19 between the full line position and the dotted line position shown in Figgure 1 so that in one position it is convenient to handle for the driver seated on the seat 6 while in the dotted line position it does not interfere with the driver entering the car or leaving the same.

Means are provided in combination with the extensible steering post for locking the tube 22 in any position desired. For this purpose I provide a rod 28 supported in the hub 29 of the steering wheel and held against endwise motion relative to the wheel by the collar 33 confined between the end of the tube and the hub of the steering wheel. The front end of the rod extends into a bore 34 of the shaft 39 and carries a disk 36 coextensive in diameter with the bore. The disk 36 is recessed as shown at 37 in Figure 4 and when this recess is aligned with a row of projections 38 in the shaft, it allows the rod 28 and with it the tube 22 to slide freely relative to the shaft 19. When the rod 28 is turned, however, by means of a handle 39, the disk is made to enter one of the spaces between the projections 38 and interlocks with the two adjacent projections so as to prevent endwise motion of the rod and the tube 22.

It should be understood that there are many different ways of rendering the steering post extensible and a second form is illustrated in Figures 3 and 6. In the latter case the tube 41 is made stationary and has a bevel gear 42 meshing with the bevel gear 12 secured thereto, while the hollow shaft 43 is slidable in the tube 41. To hold the hollow shaft against revolving motion relative to the tube 41, lines of projections 44 extending inwardly from the tube are made to ride in registering grooves 46 in the outer face of the hollow shaft 43. A rod 47 secured to the steering wheel in the manner previously described relative to the rod 28 has a disk 48 at its front end made coextensive with the dimensions of the hollow shaft 43 and provided with a notch 49 which latter is made to register with one of the grooves 46 and in that case allows of endwise motion of the hollow shaft 43 but which may also be turned so that the disk interlocks with two adjacent projections 44 of the tube 41.

The manner of using my steering post will be readily understood from the foregoing description. Normally the sleeve 22 of Figure 1 is pushed into the most forward position indicated in dotted lines and then interferes very little with the driver entering the car or leaving the same. After the driver has taken his seat, he pulls the steering wheel backward to any place that is most convenient for manipulating the same, and he thereupon turns the handle 39 whereby he locks the steering wheel in that particular position. Any rotary motion of the steering wheel is imparted through the bevel gears 18 and 12 and the bevel gears 13 and 14 to the steering arm 16 and the tie bar 17 which latter actuates the steering knuckles. This arrangement allows the driver to hold his arms in the most comfortable position, it places the steering wheel so as not to interfere with the field of vision and it allows the same to be manipulated by a straight downward pull on one side of the steering wheel and a straight upward push on the other side.

I claim:

1. A steering device for a motor vehicle comprising an extensible post consisting of two telescoping sections held against rotation relative to one another, a hand wheel at the rear end of one of the sections and a rod within the two telescoping sections having means thereon for normally locking the sections against endwise motion but allowing of such motion when the rod is revolved into a predetermined position.

2. A steering device for a motor vehicle comprising an extensible post consisting of two telescoping sections, longitudinally alined projections associated with one of the sections adapted to ride in a groove in the other section and a rod held by the latter section against longitudinal motion having a disc thereon made for normal engagement with the projections of the other section for preventing relative endwise motion of the sections, but notched to ride over the projections when the rod is turned into a predetermined position.

GUY R. DERR.